United States Patent
You et al.

(10) Patent No.: US 12,483,628 B2
(45) Date of Patent: Nov. 25, 2025

(54) COMMUNICATION METHOD, SYSTEM, INTELLIGENT TERMINAL, COMMUNICATION DEVICE, EQUIPMENT, AND MEDIUM

(71) Applicant: Shenzhen Intellirocks Tech. Co., Ltd., Shenzhen (CN)

(72) Inventors: Jie You, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 46 days.

(21) Appl. No.: 18/558,359

(22) PCT Filed: Aug. 23, 2021

(86) PCT No.: PCT/CN2021/114110
§ 371 (c)(1),
(2) Date: Oct. 31, 2023

(87) PCT Pub. No.: WO2023/015604
PCT Pub. Date: Feb. 16, 2023

(65) Prior Publication Data
US 2024/0223665 A1     Jul. 4, 2024

(30) Foreign Application Priority Data

Aug. 11, 2021   (CN) .......................... 202110921079.1

(51) Int. Cl.
*H04L 67/141* (2022.01)

(52) U.S. Cl.
CPC .................................. *H04L 67/141* (2013.01)

(58) Field of Classification Search
CPC ...... H04L 67/141; H04L 65/40; H04W 40/22; H04W 40/12; H04W 88/04
See application file for complete search history.

(56) References Cited

U.S. PATENT DOCUMENTS

2017/0359190 A1*  12/2017  Nadathur ............ H04L 12/2803
2024/0422023 A1*  12/2024  Xiao ..................... H04L 67/125

FOREIGN PATENT DOCUMENTS

CN         106950847 A        7/2017

* cited by examiner

Primary Examiner — Caroline H Jahnige
(74) Attorney, Agent, or Firm — Wenye Tan

(57) ABSTRACT

The present disclosure discloses a communication method, system, intelligent terminal, communication device, equipment, and storage medium. The method includes: determining a first device, the first device being one of a plurality of communication devices around the intelligent terminal; connecting to the first device; and sending a control instruction to the first device, wherein the control instruction is used to instruct the first device to be used as a relay node to relay the control instruction to a target communication device. Through the communication devices forwarding the control instruction, each communication device can quickly receive the control instruction, improving the real-time nature of communication and, through forwarding, communication devices further away can also receive the control instruction, extending the communication distance.

17 Claims, 7 Drawing Sheets

---

Receive a control instruction sent by an intelligent terminal and/or a communication device — S310

Use the first device as a relay node to relay the control instruction to the second device. The second device is one of the multiple communication devices around the first device. The control instruction is used to instruct the second device to serve as a relay node to transmit or relay the control instruction to a target communication device. — S320

COMMUNICATION METHOD, SYSTEM, INTELLIGENT TERMINAL, COMMUNICATION DEVICE, EQUIPMENT, AND MEDIUM

CROSS-REFERENCE TO RELATED APPLICATIONS

This application is a national stage entry of PCT Patent Application No. PCT/CN2021/114110, filed on Aug. 23, 2021, which claims the priority of Chinese Patent Application No. CN2021109210791, titled "COMMUNICATION METHOD, SYSTEM, INTELLIGENT TERMINAL, COMMUNICATION DEVICE, EQUIPMENT, AND MEDIUM," and filed on Aug. 11, 2021, the entire content of all of which is incorporated herein by reference.

FIELD OF THE DISCLOSURE

The present disclosure relates to the field of communication technology and, more specifically, to a communication method, system, intelligent terminal, communication device, device, and storage medium.

BACKGROUND

Usually, when a terminal communicates with multiple devices, the terminal needs to establish a connection with each device one by one, and then sends the communication content to each device respectively. The inventor realized that, when the number of devices is large, the above communication method often results in a large difference in the time when the devices receive communication content, unable to meet the real-time requirements of device control.

SUMMARY OF THE DISCLOSURE

In view of the above problems, the present disclosure proposes a communication method, system, intelligent terminal, communication device, equipment, and storage medium to improve the real-time nature of communication and extend the communication distance.

In a first aspect, embodiments of the present application provide a communication method, which is applied to an intelligent terminal. The communication method includes: determining a first device, the first device being one of a plurality of communication devices around the intelligent terminal; connecting to the first device; and sending a control instruction to the first device, wherein the control instruction is used to instruct the first device to be used as a relay node to relay the control instruction to a target communication device.

In a second aspect, embodiments of the present application also provide a communication method, which is applied to a first device. The communication method includes: receiving a control instruction sent by an intelligent terminal and/or a communication device; and using the first device as a relay node to relay the control instruction to at least one second device, wherein the second device is one of a plurality of communication devices around the first device, and the control instruction is used to instruct the second device to be used as a relay node to relay the control instruction to a target communication device.

In a third aspect, embodiments of the present application also provide a communication system. The communication system includes an intelligent terminal and a plurality of communication devices. The smart terminal is used to determine the first device. The intelligent terminal is used to determine a first device, the first device being one of a plurality of communication devices around the intelligent terminal; the intelligent terminal is also used to connect to the first device; the intelligent terminal is also used to send a control instruction to the first device; the first device is used to receive the control instructions sent by the intelligent terminal and/or a communication device; the first device is also used to use the first device as a relay node to relay the control instruction to at least one second device, where the second device is one of a plurality of communication devices around the first device, and the control instruction is used to instruct the second device to be used as a relay node to relay the control instruction to a target communication device.

In a fourth aspect, embodiments of the present application further provide an intelligent terminal, which includes: a first device determining module, a connecting module, and a sending module. The first device determining module is configured to determine a first device, the first device being one of a plurality of communication devices around the intelligent terminal. The connecting module is configured to connect to the first device. The sending module is configured to send a control instruction to the first device, wherein the control instruction is used to instruct the first device to be used as a relay node to relay the control instruction to a target communication device In the fifth aspect, embodiments of the present application also provide a communication device. The communication device includes: a control instruction receiving module and a sending module. The control instruction receiving module is configured to receive a control instruction sent by an intelligent terminal and/or a communication device. The sending module is configured to use a first device as a relay node to relay the control instruction to at least one second device, wherein the second device is one of a plurality of communication devices around the first device, and the control instruction is used to instruct the second device to be used as a relay node to relay the control instruction to a target communication device.

In a sixth aspect, embodiments of the present application further provide an electronic device. The electronic device includes: one or more processors, a memory, and one or more application programs. The one or more application programs are stored in the memory and configured to be executed by the one or more processors, and the one or more programs are configured to perform the method according to the above first or second aspect.

In a seventh aspect, embodiments of the present application further provide a computer-readable storage medium. The computer-readable storage medium stores program codes. The program code can be called by a processor to execute the method described according to the first aspect or the second aspect.

According to the technical solutions provided by the present disclosure, determining a first device, the first device being one of a plurality of communication devices around the intelligent terminal; connecting to the first device; and sending a control instruction to the first device, wherein the control instruction is used to instruct the first device to be used as a relay node to relay the control instruction to a target communication device, through the communication devices forwarding the control instruction, each communication device can quickly receive the control instruction, improving the real-time nature of communication and, through forwarding, communication devices further away can also receive the control instruction, extending the communication distance.

BRIEF DESCRIPTION OF THE DRAWINGS

To more clearly illustrate the technical solutions in the embodiments of the present disclosure, the drawings used in the description of the embodiments will be briefly introduced below. Obviously, the drawings in the following description are only some embodiments of the present disclosure, but not all embodiments. Based on the embodiments of the present disclosure, all other embodiments and drawings obtained by those of ordinary skill in the art without any creative efforts fall within the scope of protection of the present disclosure.

DETAILED DESCRIPTION

Figure 1:
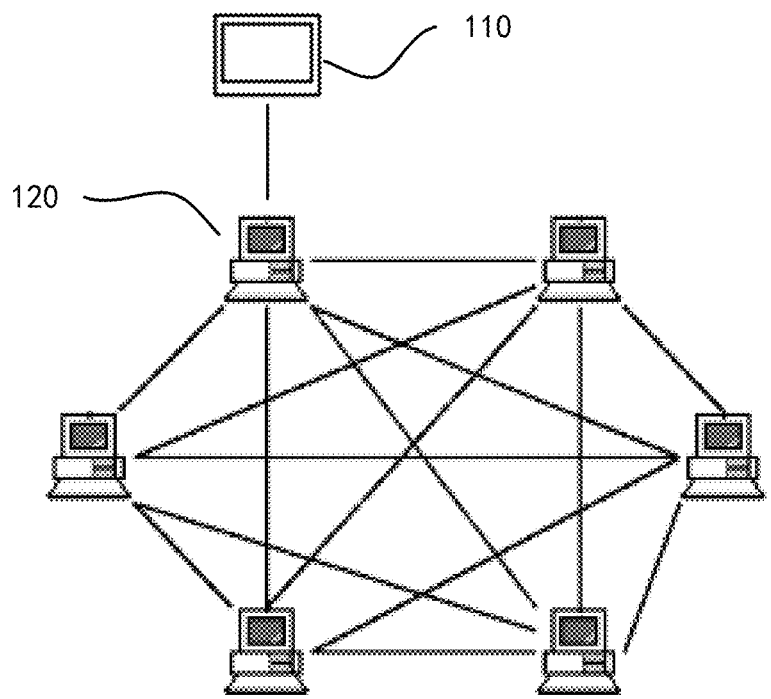
FIG. 1 shows a schematic diagram of an application environment according to an embodiment of the present disclosure.

The technical solutions in the embodiments of the present disclosure will be described below with reference to the accompanying drawings of the present disclosure. Obviously, the described embodiments are only some of the embodiments of the present disclosure, rather than all of the embodiments. Components of the embodiments of the present disclosure generally described and illustrated in the figures herein may be arranged and designed in a variety of different configurations. Accordingly, the following detailed description of the embodiments of the present disclosure provided in the accompanying drawings is not intended to limit the scope of the claimed invention, but rather to represent certain selected embodiments of the present disclosure. Based on the embodiments of the present disclosure, all other embodiments obtained by those skilled in the art without any creative work shall fall within the scope of protection of the present disclosure.

Usually, when a terminal communicates with multiple devices, for example, the terminal needs to control multiple devices to execute the same control instruction at the same time. At this time, the terminal needs to establish connections with each device one by one, and then send the communication content to each device respectively. Since the terminal establishes a connection with and sends communication content to each device one by one, the communication device that establishes connection later in time may receive the communication content later. When there are a large number of devices, the above communication method results in a large difference in the time when the devices receive the communication content, causing some control instructions that require the devices to respond in time to be unable to respond in time, thereby affecting the real-time nature of device communication.

In order to improve the above issues, the inventor of the present disclosure proposes a communication method, system, intelligent terminal, communication device, equipment, and storage medium provided by the present disclosure. By determining the first device, the first device being one of a plurality of communication devices around the intelligent terminal, connecting to the first device, and sending a control instruction to the first device. The control instruction includes a preset number, and the control instruction is used to trigger the first device to send the control instruction to a preset number of second devices. The second device is a communication device that has not received control instructions among multiple communication devices around the first device. Through forwarding the control instruction by the communication devices, each communication device can quickly receive the control instruction, improving communication real-time nature. Further, through forwarding, communication devices further away can also receive the control instruction, extending the communication distance.

The application environment of the communication method provided by the embodiment of the present disclosure will be introduced below.

Referring to FIG. 1. FIG. 1 shows a communication system provided by an embodiment of the present disclosure. The communication system 100 includes: an intelligent terminal 110 and a plurality of communication devices 120.

In the embodiments of the present disclosure, the intelligent terminal 110 may include but is not limited to terminal devices such as smartphones, tablets, wearable devices, and smart control panels.

In the embodiments of the present disclosure, the intelligent terminal 110 can search for the communication device 120 that is in the same first network as the intelligent terminal 110 and obtain the signal strength of the searched communication devices 120 through scanning. When the intelligent terminal 110 receives a scan instruction, the intelligent terminal 110 may be triggered to perform a scan operation. In some implementations, the scanning operation can be directly triggered by the user. For example, the user can trigger the scan button on an interactive interface of the intelligent terminal 110 to trigger the generation of the scan instruction. In some embodiments, the scan operation may also be triggered by relevant events. For example, when the intelligent terminal 110 receives communication content that needs to be sent to the communication device 120, the intelligent terminal 110 triggers the generation of a scan instruction.

In the embodiments of the present disclosure, the intelligent terminal 110 can establish a connection with any searched/found communication device 120 and transmit the communication content. In some embodiments, the intelligent terminal 110 can search for multiple communication devices 120 that are also in the first network through scanning. Search results can be displayed in the interactive interface in the form of a list. For example, the signal strength of the searched communication devices 120 can also be displayed on the list, and can also be sorted according to the strength of the signal. In some implementations, the user can select the communication device 120 that needs to establish a connection on the list, and trigger the intelligent terminal 110 to establish a connection with the communication device 120 selected by the user. In some embodiments, the search results may not be displayed, and the intelligent terminal 110 may select the communication device 120 that needs to be connected from the multiple searched communication devices 120 according to a preset rule. The preset rule may be, for example, the communication device 120 with the strongest signal strength among the plurality of searched communication devices 120.

In the embodiments of the present disclosure, the number of communication devices 120 is set to be multiple, and the multiple communication devices 120 may be located in a second network. In the embodiments of the present disclosure, the communication device 120 may include but is not limited to smart home products, such as smart lights, smart speakers, smart curtains, smart doors, etc.

In some implementations, the first network and the second network may be the same network, and the intelligent terminal 110 may communicate with all devices of the plurality of communication devices 120.

In other implementations, the first network and the second network may also be different networks. The intelligent terminal 110 can communicate with the communication devices 120 that are also in the first network. When the intelligent terminal 110 needs to communicate with the target communication device 120 in the second network, the intelligent terminal 110 can first transmit the communication content to the communication device 120 that is also in the first network, and then the device 120 that receives the communication content transmits to the target communication device 120.

Further, the first network and/or the second network may use standard communication technologies and/or protocols. The first network and/or the second network are usually the Internet, but can also be any network, including but not limited to Local Area Network (LAN), Metropolitan Area Network (MAN), Wide Area Network (WAN), mobile, wired, or wireless network, private network, or virtual private network. In some implementations, devices in the first network and/or the second network can perform communication transmission through communication protocols, including but not limited to BLE (Bluetooth low energy) protocol, WLAN (Wireless Local Area Network or Wireless LAN) protocol, Bluetooth protocol, ZigBee protocol or Wi-Fi (Wireless Fidelity, Wireless Fidelity) protocol, etc.

In the embodiments of the present disclosure, each communication device 120 can search for other communication devices 120 that are in the same second network as the communication device 120 and obtain the signal strength of the searched communication devices 120 through scanning.

In the embodiments of the present disclosure, the communication device 120 can establish connections with other communication devices 120. In some implementations, the communication device 120 can establish a connection with one of the communication devices 120 and accept the communication content sent by the communication device 120. In some implementations, the communication device 120 can also establish a connection with one of the communication devices 120 and send the communication content to the connected communication device 120. In some embodiments, the communication device 120 can establish a connection with one of the communication devices 120 and receive the communication content sent by the connected communication device 120 while simultaneously establishing a connection with another communication device 120 and sending the communication content to the another communication device 120.

In the embodiments of the present disclosure, the intelligent terminal 110 can send the communication content to the communication device 120, and the communication device 120 can further send the communication content to other communication devices 120, so that the communication content can be quickly sent to each communication device 120, improving the real-time performance of communication.

Various embodiments of the present disclosure will be described in detail below with reference to the accompanying drawings.

Figure 2:
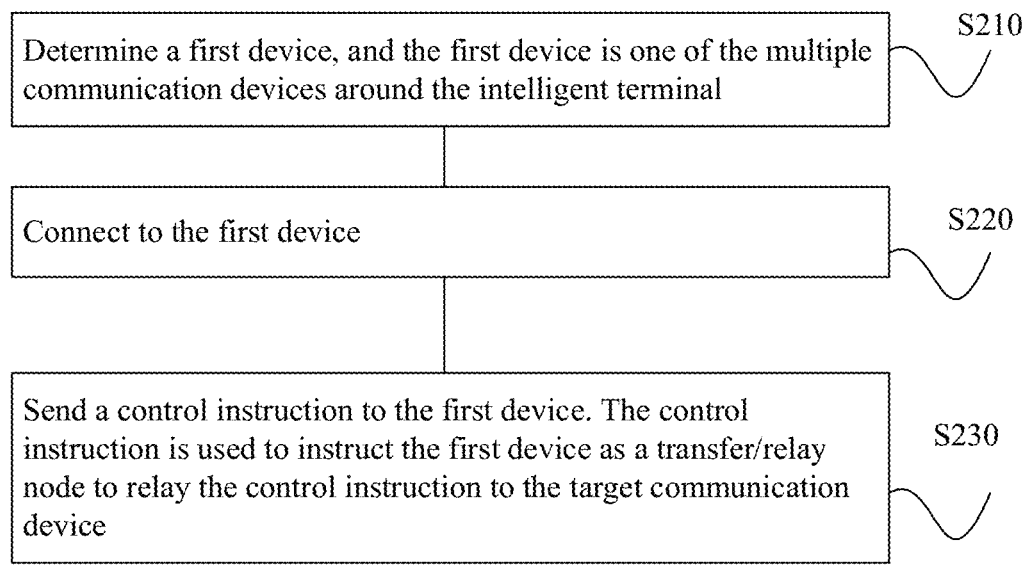
FIG. 2 shows a schematic flowchart of a communication method according to an embodiment of the present disclosure.

Referring to FIG. 2, an embodiment of the present disclosure provides a communication method that can be applied to an intelligent terminal. The method may include Steps S210 to S230.

Step S210: Determine a first device, and the first device is one of the multiple communication devices around the intelligent terminal.

In the embodiments of the present disclosure, the intelligent terminal can generate a control instruction to control a communication device. In some implementations, the user can trigger the generation of a corresponding control instruction on the interactive interface of the intelligent terminal. For example, the user controls the switch on/off or the mode, etc., of a smart light on the interface of the intelligent terminal. In some implementations, the intelligent terminal may generate a corresponding control instruction according to a preset rule. For example, the preset rule may be to control all smart lights to turn off within a specified time, and within the specified time, the intelligent terminal generates a corresponding control instruction(s) to control all smart lights to turn off.

In some implementations, the control instruction may be to control only one of the communication devices. In some implementations, the control instruction may also be to control all communication devices. In some implementations, the control instruction may also be to control a group and/or a specific type of communication devices.

In order to distinguish the control devices corresponding to the control instructions, the control instruction may include a control type. The control type may be, for example, a point control type, a set control type, a group control type, etc. The point control type indicates that the control instruction is used to control a specific communication device among multiple communication devices around the intelligent terminal. The set control type is used to characterize the control instruction used to control all communication devices of the multiple communication devices around the intelligent terminal. The group control type indicates that the control instructions are used to control the communication devices belonging to the same group among the multiple communication devices around the intelligent terminal. Therefore, the communication method provided by the embodiments of the present disclosure can implement a variety of different control types, thereby facilitating the user to choose the appropriate control method, which can be applied to more types of application scenarios.

In some implementations, different control types can be distinguished by setting a control field corresponding to the control types in the control instruction. Different control types have different corresponding control fields. For example, the highest byte of the control instruction can be defined as the control field. When the control field is "F", the control instruction is to control one of the communication devices, and the communication device to be controlled can be further determined by the address of the communication device. For another example, when the control field is "E", the control instruction is to control all communication devices. At this time, all communication devices that receive the control instruction need to execute the corresponding control instruction. For another example, when the control field is "D", the control instruction is to control a group or a category of communication devices, and the communication devices to be controlled can be further determined by the group or category of the communication devices. It can be understood that other control methods can also be set and different control methods can be distinguished in other ways, and the present disclosure does not limit this.

In the embodiments of the present disclosure, the intelligent terminal needs to send the control instruction to the communication device. The intelligent terminal sends the control instruction to one of the communication devices at a time. Therefore, before sending the control instruction, the intelligent terminal needs to determine the first device.

In the embodiments of the present disclosure, the first device is one of multiple communication devices around the intelligent terminal. In order to ensure the stability of the communication process, the intelligent terminal can give priority to sending control instructions to the communication device with the strongest signal strength among the multiple surrounding communication devices.

In the embodiments of the present disclosure, the intelligent terminal can search for communication devices that are in the same first network as the intelligent terminal through scanning. Optionally, a device with stronger signal strength is easier to be searched and found, and the intelligent terminal can use the communication device first found as the first device. Optionally, the intelligent terminal can compare the signal strength of multiple searched communication devices, and use the communication device with the strongest signal strength as the first device.

Step S220: Connect to the first device.

In the embodiments of the present disclosure, after determining the first device, the intelligent terminal connects to the first device. In one embodiment of the present disclosure, the established connection may be a BLE connection, etc. The specific communication connection establishment process may be any appropriate technology in this field and will not be described again here.

Step S230: Send a control instruction to the first device. The control instruction is used to instruct the first device as a transfer/relay node to relay the control instruction to the target communication device(s).

In order to send control instructions to all communication devices, in the related technology, the intelligent terminal is to establish a connection with each communication device separately, and the control instructions are sent to the communication devices respectively. This takes a long time and cannot meet the real-time requirements of communication.

In order to enable the control instructions to be sent to all communication devices as soon as possible to ensure real-time communication, in the embodiments of the present disclosure, after receiving the control instruction, the first device can serve as a transfer node and forward the control instruction to the surrounding communication devices. After other communication devices receive the control instruction, these communication devices continues to serve as a transfer node and forward the control instruction to surrounding communication devices, thereby relaying the control instructions to the target communication device. The target communication device is one or more communication devices that the intelligent terminal needs to communicate and/or control. The number of target communication devices may be one or more, or may be all the communication devices. By using the first device and other communication devices that have received the control instruction as relay nodes to forward the control instruction, the control instruction can be quickly sent to all communication devices, thereby relaying the control instruction to the target communication devices.

As an implementation, the control instruction may include a preset number. When receiving the control instruction, the first device parses the control instruction to obtain the preset number, thereby sending the control instruction to the preset number of communication devices respectively, thereby relaying the control instruction to the target communication devices.

The preset number is the number of other communication devices that the first device needs to send the control instruction to. For example, the preset number can be selected from 5 to 10. It is understandable that the higher the value of the preset number is set, the higher the transmission speed of the control instructions, but the corresponding energy consumption is more. Therefore, the selection of the preset number can be set according to actual use requirements, and the present disclosure does not limit this.

In other embodiments, the control instruction further include an instruction identifier (e.g., a time stamp). The instruction identifier is used to uniquely identify the control instruction. That is to say, different control instructions generated by the intelligent terminal have different instruction identifiers, so the communication device can compare the instruction identifier in the control instruction with the locally recorded instruction identifiers, and confirm whether the corresponding control instruction has been received based on the comparison result. If the comparison result is identical, it is determined that the control instruction has been received before. If the comparison result is not identical, it is determined that the control instruction has not been received before. The time stamp may be, for example, the time when the control instruction is generated. Each control instruction is generated at a different time. Therefore, the time stamp can be used to uniquely distinguish the control instructions.

In some embodiments, the control instruction also includes instruction content. The instruction content includes control content that the communication device to be controlled needs to execute. For example, it may specifically include control parameters that control the communication device to be controlled to operate, shut down, operate in a specific mode, or operate at a specific time, etc.

In the embodiments of the present disclosure, the control instruction may be sent in the form of a message. The message may include a message header, and a message body, etc. That is, the control instruction can be obtained by encapsulating the message header and message body. Optionally, the message header may include a preset number, and an instruction identifier, etc. Optionally, the message header may also include a device identifier, which may be, for example, the device identifier of the first device. Therefore, the communication device can obtain the preset number, instruction identifier and other information by parsing the message header. The message body may include instruction content, etc., so that the communication device can obtain the instruction content, etc., by parsing the message body.

It can be understood that in the embodiments of the present disclosure, the core content of the control instructions sent by the intelligent terminal to the first device and the core content of the control instructions sent by the first device to the second device according to the control instructions sent by the intelligent terminal are the same. That is, the preset number, instruction identifier, instruction content, etc., in the control instructions are the same. The intelligent terminal sends the control instruction to the communication device by directly sending or by forwarding. The communication device can obtain the same preset number, instruction identifier, instruction content and other contents based on the control instruction analysis. During the forwarding process of the control instruction, some fields of the control instruction may be adjusted accordingly depending on the forwarding target. For example, the message header of the control instruction may include the address or identification of the forwarding target, etc. In the embodiments of the present disclosure, as long as the control instructions can enable the communication device to parse and obtain the same preset number, instruction identifier, instruction content, etc., even if some fields are adjusted due to forwarding needs, they should be considered to be the same control instruction.

Figure 3:
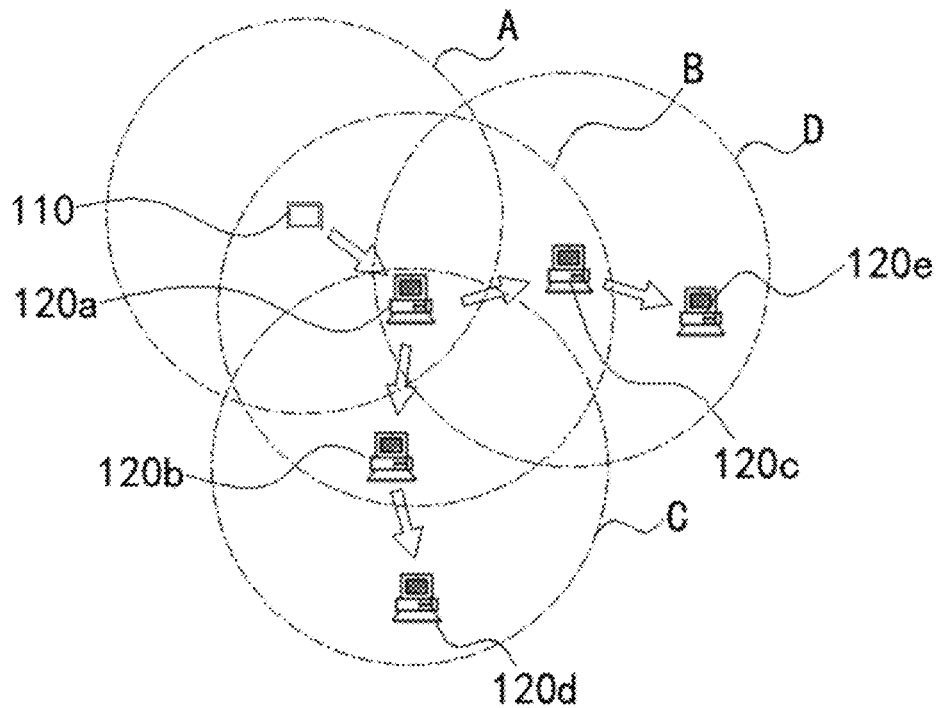
FIG. 3 shows a schematic diagram of a control instruction forwarding process according to an embodiment of the present disclosure.

In the embodiments of the present disclosure, the control instruction is used to instruct the first device as a transfer node to relay the control instruction to a preset number of second devices. Where the second device is a communication device to which the first device has not sent a control instruction. Specifically, the first device may save the identifiers of the communication devices that have been sent to a sent list, and the first device may select the communication device whose device identifier is not in the sent list as the forwarding target. In this way, after receiving the control instruction, the first device continues to send the control instruction to other communication devices, and the other communication devices are the communication devices that the first device has not sent the control instruction to, so the control instruction can be quickly sent to all communication devices, effectively improving the real-time nature of communication. Moreover, the intelligent terminal sends the control instruction to the first device within the transmission distance of the intelligent terminal, and the first device continues to send the control instruction to the second devices within the transmission distance of the first device. That is, the intelligent terminal can send the control instruction through the first device to second devices further away from the intelligent terminal. For example, as shown in FIG. 3, it is a schematic diagram of communication connections between multiple devices in the technical solution scenario in the embodiments of the present disclosure. In FIG. 3, under an ideal situation without signal obstacles, the communicable range of each device is a circular area centered on the device, and its communication distance is the radius of the circular area and is affected by the radio frequency power. Radius values may differ from device to device. For example, the communicable range of a terminal device is area A in FIG. 3, and the communicable ranges of the communication devices 120a-120c are areas B, C, and D in FIG. 3 respectively. In the existing technical solution, since the five communication devices 120a-120e are relatively scattered, the terminal device 110 cannot control the five devices at the same time no matter how it moves. Through the technical solutions in the embodiments of the present disclosure, the intelligent terminal 110 can relay the issued control instruction to the further communication devices 120b and 120c through the communication device 120a, and the communication devices 120b and 120c can then receive the control instruction respectively. The control instructions are relayed to the communication devices 120d and 120e, thereby achieving the technical effect that the terminal device 110 can perform control over a distance.

Accordingly, the communication method provided by an embodiment of the present disclosure determines the first device, which is one of the multiple communication devices around the intelligent terminal, connects to the first device, and sends a control instruction to the first device. The control instruction is used to instruct the first device as a transfer node to relay the control instruction to the target communication device. Through the communication devices forwarding the control instruction, each communication device can quickly receive the control instruction and improve the real-time communication characteristics, and through forwarding, communication devices further away can also receive control instructions, extending the communication distance.

Figure 4:
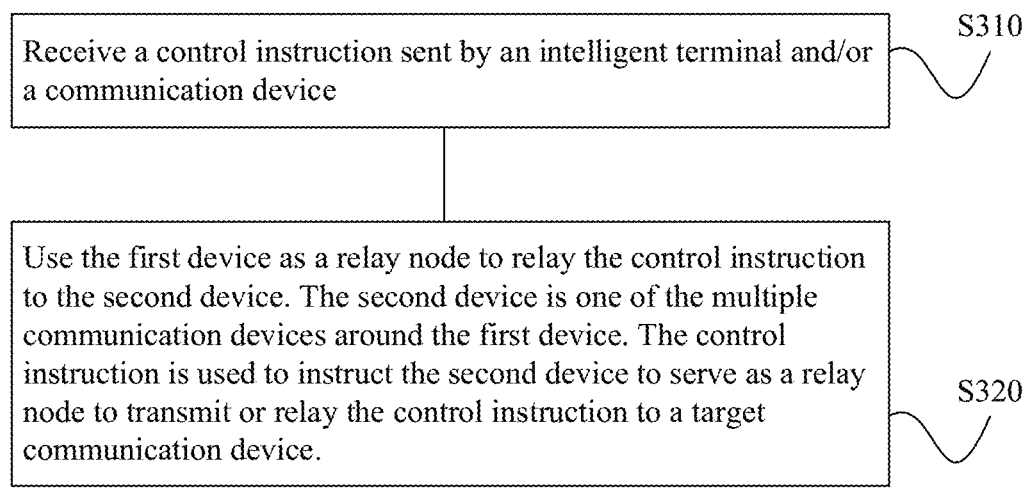
FIG. 4 shows a schematic flowchart of a communication method according to another embodiment of the present disclosure.

Referring to FIG. 4, another embodiment of the present disclosure provides another communication method, which can be applied to the first device side. The method can include Steps S310 to S320.

Step S310: Receive a control instruction sent by an intelligent terminal and/or a communication device.

In the embodiments of the present disclosure, the first device can establish a communication connection with the intelligent terminal and receive the control instruction sent by the intelligent terminal. The first device can also establish communication connections with other communication devices and receive control instructions sent by other communication devices.

Step S320: Use the first device as a relay node to relay the control instruction to the second device. The second device is one of the multiple communication devices around the first device. The control instruction is used to instruct the second device to serve as a relay node to transmit or relay the control instruction to a target communication device.

In some implementations, the second device is a communication device to which the first device has not sent the control instruction. Specifically, the first device may save the identifier of the communication devices that has been sent to a sent list, and the first device may select the communication device whose device identifier is not in the sent list as the forwarding target. In this way, after receiving the control instruction, the first device continues to send the control instruction to other communication devices that have not been sent the control instruction, so that the control instruction can be quickly sent to all communication devices, effectively improving the real-time performance of communication.

In the embodiments of the present disclosure, the control instruction may include a preset number. The first device determines the preset number by parsing the control instruction. For example, the preset number is set in a preset field of the message header of the control instruction, and the first device parses the control instruction to extract the content corresponding to the preset field, thereby determining the preset number. After receiving the control instruction, the first device uses the first device as a transfer node to send the control instruction to the preset number of second devices. The control instruction is also used to instruct the second device to be used as a transfer node to send the control instruction to a preset number of third devices respectively, thereby relaying the control instruction to the target communication device. Further, the third device is one of the multiple communication devices surrounding the second device. For example, the third device is a communication device to which the second device has not sent the control instruction. Therefore, the control instruction is relayed to the second device using the first device as a transfer node, and then is relayed to the third device using the second device as a transfer node. Therefore, the control instruction is continuously transmitted to other communication devices using the communication devices that receive the control instruction as a transfer node. Thus, each communication device can quickly receive control instructions and improve the real-time nature of communication.

In some implementations, the control instruction may also include instruction content. The instruction content includes but is not limited to the control content that the communication device to be controlled needs to execute, for example: to control the communication device to be controlled to operate, shut down, operate in a specific mode, operate at a specific time, etc. The instruction content may be set in the message body of the control instruction. The first device parses the control instruction to extract the content of the message body, thereby determining the instruction content.

In some implementations, the control instruction may also include an instruction identifier. The instruction identifier can be used to distinguish different control instructions, and different control instructions correspond to different instruction identifiers. The first device can use the instruction identifier to distinguish whether the received control instruction is a control instruction received for the first time. The instruction identifier may be set in the message header of the control instruction. The first device parses the control instruction to extract fields corresponding to the message header and the instruction identifier, thereby determining the instruction identifier.

For example, the first device can save the instruction identifiers of all received control instructions. When the first device receives a control instruction, it can compare the instruction identifier in the received control instruction with the saved instruction identifiers, and determine whether the received control instruction is a control instruction received for the first time.

In some implementations, the first device may determine the number of control instructions that the first device needs to send to other communication devices by using a preset number. In the embodiments of the present disclosure, the first device distributes the control instruction to a preset number of second devices respectively. That is, the first device sends the control instruction to one second device each time until the control instruction is sent to the preset number of second devices. Specifically, the first device counts the number of second devices that have been sent the control instruction. For example, the initial value of the number of second devices is zero. Each time the first device sends the control instruction to a second device, the number of the second devices is updated, and the number of the second devices may be increased by 1 each time, thereby counting the number of the second devices that have been sent the control instruction by the first device.

In the embodiments of the present disclosure, the first device and multiple surrounding communication devices may be in a state of pre-established connection, or may be in a state of no pre-established connection.

In some implementations, the first device does not maintain connections with multiple surrounding communication devices in advance. That is, the first device and the communication device are in a disconnected state. At this time, if the first device needs to send a control instruction to the communication device, it needs to establish a connection with the communication device first, and then send the control instruction to the corresponding communication device.

In some implementations, the first device pre-establishes a connection with at least one communication device among a plurality of surrounding communication devices. The first device may be always connected to the communication device, or may be set by the user in advance to remain connected within a preset time period. It can be understood that if the first device and the communication device are in a connected state, the first device can directly send the control instruction to the communication device, thereby saving time in the connection establishment process and further improving the efficiency of transmitting control instructions.

Optionally, the first device may maintain pre-established connections with multiple surrounding communication devices, so that the first device can directly send the control instruction to any one of the multiple surrounding communication devices. For example, in an application scenario where multiple communication devices are smart light modules, after the smart light modules are installed, the multiple smart light modules can remain connected.

Optionally, the first device may maintain pre-established connections with some of the surrounding communication devices. These communication devices may be, for example, the communication devices closest to the first device or the communication devices with the strongest signal strength. These communication devices may also be set according to the actual use needs of the user, which is not limited in the present disclosure. Therefore, the first device can directly send the control instruction to any communication device among these connected communication devices. In addition, if the first device needs to send a control instruction to some unconnected communication devices, the first device may first perform the steps of establishing a connection with the communication device, and then send the control instruction to the corresponding communication device.

In some implementations, the second device also pre-establishes a connection with at least one communication device among multiple surrounding communication devices. That is, among the plurality of communication devices, each communication device can pre-establish a connection with at least one communication device. Before multiple communication devices send control instructions, the pre-established connection between communication devices can be used to quickly forward the control instructions, thereby greatly improving the efficiency of sending control instructions.

In the embodiments of the present disclosure, in order to enable the control instruction to be quickly sent to all communication devices, after receiving the control instruction, the first device continues to send the received control instruction to a preset number of communication devices respectively. It can be understood that if there is a communication device to which the first device has sent the control instruction, and the first device sends the control instruction to the communication device again, the first device will repeatedly send the control instruction to the same communication device, which will reduce the transmission efficiency of control instructions. In order to improve the transmission efficiency of the control instruction and improve the real-time nature of communication, in the embodiments of the present disclosure, the first device sends the control instruction to a preset number of second devices respectively, and the second device is the communication device that has not been sent control instruction by the first device. That is, the first device sends the control instruction to a preset number of communication devices to which the first device has not sent the control instruction. This may ensure that the first device sends the control instruction to a preset number of communication devices.

In some implementations, the first device sequentially confirms the second device and sends the control instruction to the second device until the control instruction is sent to a preset number of second devices. Optionally, the first device may determine the order in which the control instruction is sent according to the strength of the signal from the second device. That is, the first device can first send the control instruction to a second device with stronger signal strength.

Further, the control instruction can also trigger the second device to continue to send the control instruction to a preset number of third devices. Similarly, the third device is a communication device, among the multiple communication devices around the second device, that has not been sent the control instruction by the second device. The control instruction is continuously sent to surrounding communication devices that have not been sent the control instruction, effectively increasing the transmission distance of the communication devices. It is no longer only the intelligent terminal that participates in the transmission of control instructions. After receiving the control instructions, all communication devices can serve as senders of the control instruction and continue to transmit the control instruction to the surrounding communication devices until all communication devices receive the control instruction, thereby greatly improving the real-time performance and transmission distance of communication.

In some implementations, after the first device sends the control instruction to the preset number of second devices respectively, the first device ends forwarding the control instruction. In some cases, the first device cannot send the control instruction to the preset number of second devices respectively. For example, among the communication devices around the first device, the number of communication devices to which the first device has not sent the control instruction is less than the preset number. For another example, the first device has a network failure and cannot transmit the control instruction to the second devices. In order to prevent the first device from always being in the control instruction forwarding state, in some embodiments, a time limit is set for the first device to complete sending the control instruction to the preset number of second devices respectively. That is, within the preset time limit, if the first device does not send the control instruction to the preset number of second devices respectively, the first device continues to try to forward the control instruction. After the preset time limit, if the first device still has not completed sending the control instruction to the preset number of second devices, the first device may also end forwarding the control instructions, so as to prevent the first device from always being in a control instruction forwarding state. Further, the first device may send the control instruction to the preset number of second devices within a preset time limit from when the first device determines the preset number according to the control instruction. The length of the preset time limit may be set according to actual needs. It can be, for example, 20 seconds, 30 seconds, 60 seconds, etc., and the present disclosure does not limit this.

In some implementations, the first device may also determine the control content and the execution device that needs to execute the control content based on the instruction content.

In some embodiments, the instruction content may also include a control type, for example, by setting a control field in the instruction content to distinguish control instructions of different control types.

As an example, when the control field is "F", the control instruction is to control one of the communication devices. At this time, the control instruction also includes the identifier of the communication device to be controlled, such as the address of the communication device to be controlled, etc. The first device can determine whether the device belongs to the execution device through the identifier of the communication device to be controlled.

As an example, when the control field is "E", the control instruction is to control all communication devices. At this time, the first device and other communication devices that receive the control instruction all belong to the execution devices.

As an example, each communication device is divided into different groups in advance, and each communication device stores a corresponding group identifier. When the control field is "D", the control instruction is to control a group of communication devices. At this time, the control instruction also includes the group identifier corresponding to the group to be controlled. When the communication device receives the control instruction, the communication device compares the group identifier obtained by parsing the control instruction with the group identifier previously maintained by the communication device. If they are identical, the communication device executes the control content of the control instruction. If they are not identical, the communication device only forwards the control instruction.

In some implementations, the instruction content may also include control content. If the first device is an execution device, the first device also needs to execute the control content. The control content may include but is not limited to an event identifier, execution time, etc., of the event to be executed. Optionally, the execution device is required to complete the execution of the event. Optionally, the execution device needs to complete the execution event at/by the execution time.

Accordingly, in a communication method provided by another embodiment of the present disclosure, using a first device to receive a control instruction sent by an intelligent terminal and/or a communication device, and using the first device as a transfer node, the control instruction is relayed to a second device. The second device is one of the communication devices among the multiple communication devices around the first device. The control instruction is used to instruct the second device to be used as a transfer node to relay the control instruction to a target communication device. Thus, the intelligent terminal is no longer the only one participating in the transmission of the control instruction. After receiving the control instruction, all communication devices can serve as the sender of the control instruction and continue to transmit the control instruction to the surrounding communication devices until all communication devices have received the control instruction, thereby greatly improving the real-time performance and transmission distance of communication.

Figure 5:
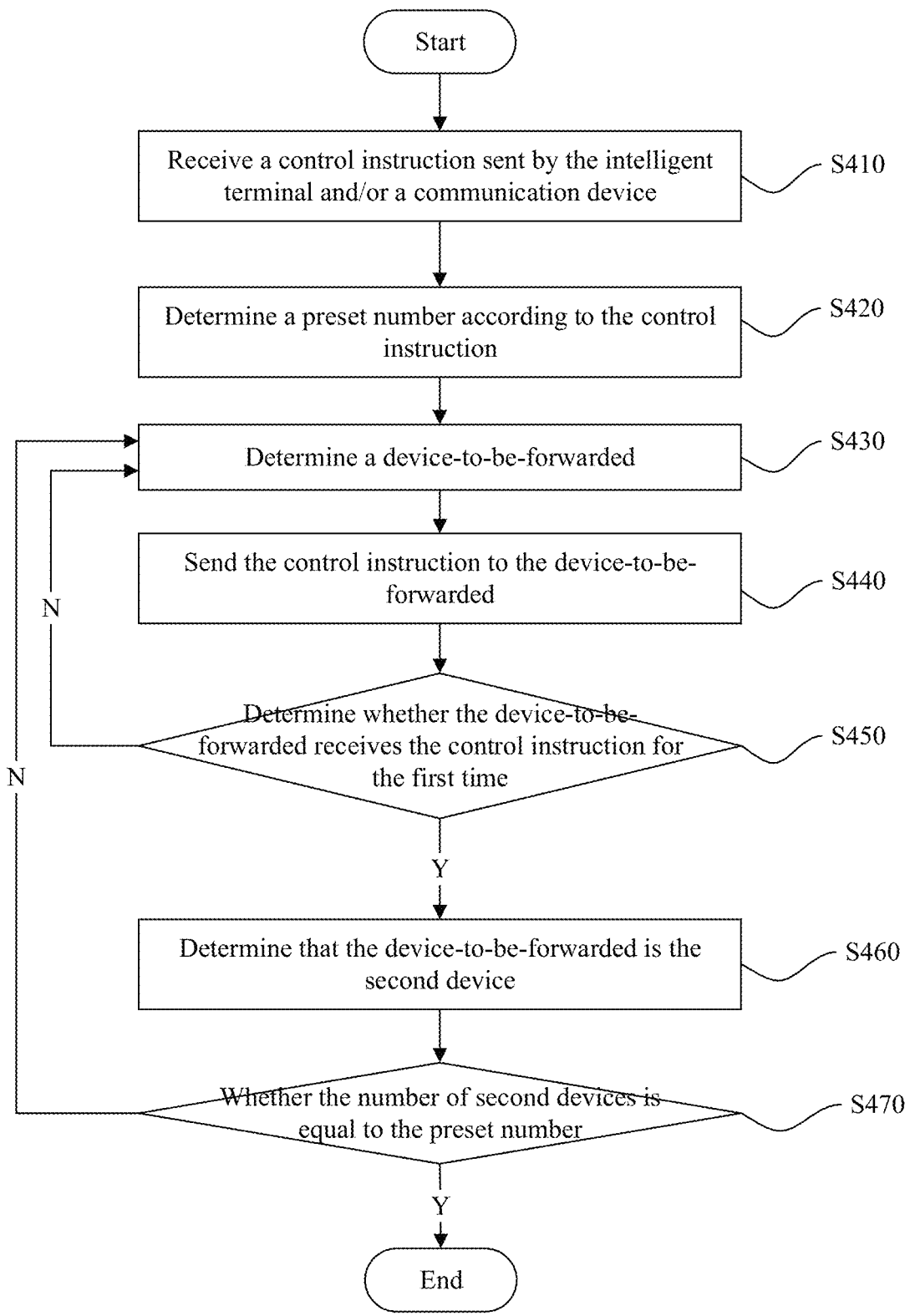
FIG. 5 shows a schematic flowchart of a communication method according to another embodiment of the present disclosure.

Referring to FIG. 5, another embodiment of the present disclosure provides a communication method that can be applied to a first device. One embodiment provides an implementation method of sending control instructions to a preset number of second devices respectively. The method may include Steps S410 to S470.

Step S410: Receive a control instruction sent by the intelligent terminal and/or a communication device.

Step S420: Determine a preset number according to the control instruction.

For detailed descriptions of Steps S410 to S420, referring to the above embodiments and are not described again here.

Step S430: Determine a device-to-be-forwarded, the device-to-be-forwarded is one of the multiple communication devices around the first device.

In the embodiments of the present disclosure, the first device may determine, through scanning, the communication device with the strongest signal strength among the multiple surrounding communication devices as the device-to-be-forwarded.

In some implementations, the first device may store the identifier of any communication device that has been sent the control instruction. The identifier of the communication device may be, for example, a device address or a device identifier code. The first device may first determine the communication device with the strongest signal strength among multiple surrounding communication devices, and compare the identifier of the communication device with the stored identifiers. If the identifier of the communication device does not exist in the stored identifiers of communication devices, the communication device is determined to be the device-to-be-forwarded.

Step S440: Send the control instruction to the device-to-be-forwarded.

In the embodiments of the present disclosure, the first device and the device-to-be-forwarded may be in a pre-established connection state. The first device and the device-to-be-forwarded may also be in a state where no connection has been established in advance.

In some implementations, if the first device is pre-connected to the device-to-be-forwarded, the control instruction is directly sent to the device-to-be-forwarded.

In other implementations, if the first device and the device-to-be-forwarded are not connected in advance, the first device first connects to the device-to-be-forwarded, and then sends the control instruction to the device-to-be-forwarded.

Step S450: Determine whether the device-to-be-forwarded receives the control instruction for the first time.

In the embodiments of the present disclosure, when the first device is connected to the device-to-be-forwarded, the first device further sends the control instruction to the device-to-be-forwarded. It can be understood that it is further necessary to determine whether the device-to-be-forwarded has received the same control instruction before the first device sends the control instruction. If the device-to-be-forwarded has not received the same control instruction, then the forwarding by the first device is valid forwarding. By determining whether the device-to-be-forwarded receives the control instruction for the first time, it can ensure that the first device forwards the control instruction to the communication device that has not received the control instruction, thereby preventing the communication device from repeatedly receiving the control instruction and from affecting the forwarding efficiency of the control instruction.

In the embodiments of the present disclosure, the first device sends the control instruction to the device-to-be-forwarded. The device-to-be-forwarded further determines whether it receives the control instruction for the first time, and sends the determination result to the first device.

Figure 6:
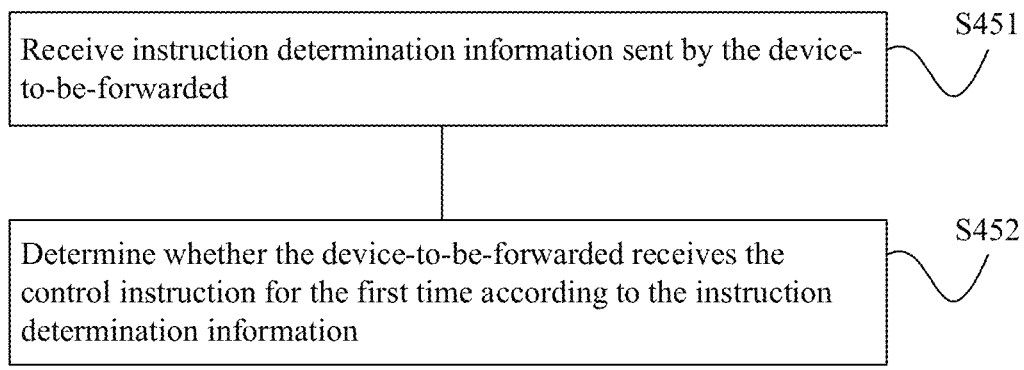
FIG. 6 shows a schematic flowchart of S450 according to another embodiment of the present disclosure.

Specifically, referring to FIG. 6, which shows a schematic flowchart of Step S450 in yet another embodiment of the present disclosure. In one embodiment of the present disclosure, Step S450 may include: Steps S451 to Step S452.

Step S451: Receive instruction determination information sent by the device-to-be-forwarded. The instruction determination information is used to indicate whether the device-to-be-forwarded has received the control instruction before.

The instruction identifier table of the device-to-be-forwarded includes the instruction identifiers of all control instructions received by the device-to-be-forwarded. If the instruction identifier table of the device-to-be-forwarded does not contain an instruction identifier that is the same as the instruction identifier of the control instruction, it indicates that the device-to-be-forwarded has not received the control instruction before.

In order to determine whether the device-to-be-forwarded receives the control instruction for the first time, as an implementation of the present disclosure, when the device-to-be-forwarded receives the control instruction, it compares the instruction identifier in the control instruction with the instruction identifiers in the instruction identifier table stored in the device-to-be-forwarded. In the embodiments of the present disclosure, the device-to-be-forwarded stores the instruction identifiers of received control instructions to form an instruction identifier table. If the instruction identifier table of the device-to-be-forwarded does not contain the same instruction identifier as the instruction identifier of the control instruction just received, the device-to-be-forwarded has not received the control instruction before. That is, the device-to-be-forwarded receives the control instruction for the first time. If the instruction identifier table of the device-to-be-forwarded contains the same instruction identifier as the instruction identifier of the control instruction just received, the device-to-be-forwarded has received the control instruction before.

In some implementations, after determining whether the device-to-be-forwarded has received the control instruction before, the device-to-be-forwarded generates instruction determination information representing whether the device-to-be-forwarded has received the control instruction, and the device-to-be-forwarded sends the instruction determination information to the first device.

In some embodiments, if the instruction identifier table of the device-to-be-forwarded does not contain the same instruction identifier as the instruction identifier of the control instruction just received. That is, the device-to-be-forwarded determines that the control instruction has not been received before, the device-to-be-forwarded updates the stored instruction identifier table. That is, the instruction identifier in the control instruction just received is stored in the instruction identifier table.

Step S452: Determine whether the device-to-be-forwarded receives the control instruction for the first time according to the instruction determination information.

In one embodiment, after receiving the instruction determination information, the first device parses the instruction determination information or message and further determines whether the device-to-be-forwarded receives the control instruction for the first time. The instruction determination information may include a field indicating whether it has been received before. This field may be preset. If the field is 1, it indicates that the device-to-be-forwarded has received the control instruction. If this field is 0, it means that the device-to-be-forwarded has not received the control instruction. It can be understood that other methods can be used to define the meaning of the instruction determination information, and the present disclosure does not limit this.

In the embodiments of the present disclosure, if the first device determines that the device-to-be-forwarded has received the control instruction according to the instruction determination information, it determines that the device-to-be-forwarded is not a second device, and returns to the Step of determining the device-to-be-forwarded.

Step S460: If the first device determines that the device-to-be-forwarded has not received the control instruction according to the instruction determination information, determine that the device-to-be-forwarded is the second device.

In the embodiments of the present disclosure, if the first device determines that the device-to-be-forwarded has not received the control instruction according to the instruction determination information, it determines that the device-to-be-forwarded is the second device. The initial value of the number of second devices is zero. When the first device determines that the device-to-be-forwarded is the second device, it updates the number of second devices. Specifically, when it is confirmed that the device-to-be-forwarded is the second device, the number of the second devices is increased by 1, and when it is confirmed that the device-to-be-forwarded is not the second device, the number of the second devices remains unchanged.

Step S470: If the number of second devices is not equal to the preset number, return to the Step of determining the device-to-be-forwarded.

In the embodiments of the present disclosure, if the number of second devices is not equal to the preset number, the step of determining the devices to be forwarded is returned to execution, and the first device continues to send the control instruction to other communication devices.

After the first device sends the control instruction to the preset number of second devices, the first device ends forwarding the control instruction.

In some implementations, when the first device finishes forwarding the control instructions, that is, the first device has forwarded the control instruction to the preset number of second devices, the stored identifiers of the communication devices that have been sent the control instruction can be deleted. So as not to affect the forwarding of other control instructions by the first device.

Accordingly, another embodiment of the present disclosure relates to a communication method, which is improved on the basis of the previously explained embodiments. The main improvement includes that, in one embodiment, by sending the control instruction to the device-to-be-forwarded, the received instruction determination information sent by the device-to-be-forwarded is used to determine whether the device-to-be-forwarded has received the control instruction before, thereby sending the control instruction to a preset number of second devices. That is, the control instruction is continuously transmitted to surrounding communication devices until all communication devices receive the control instruction, thereby greatly improving the real-time performance and transmission distance of communication.

Figure 7:
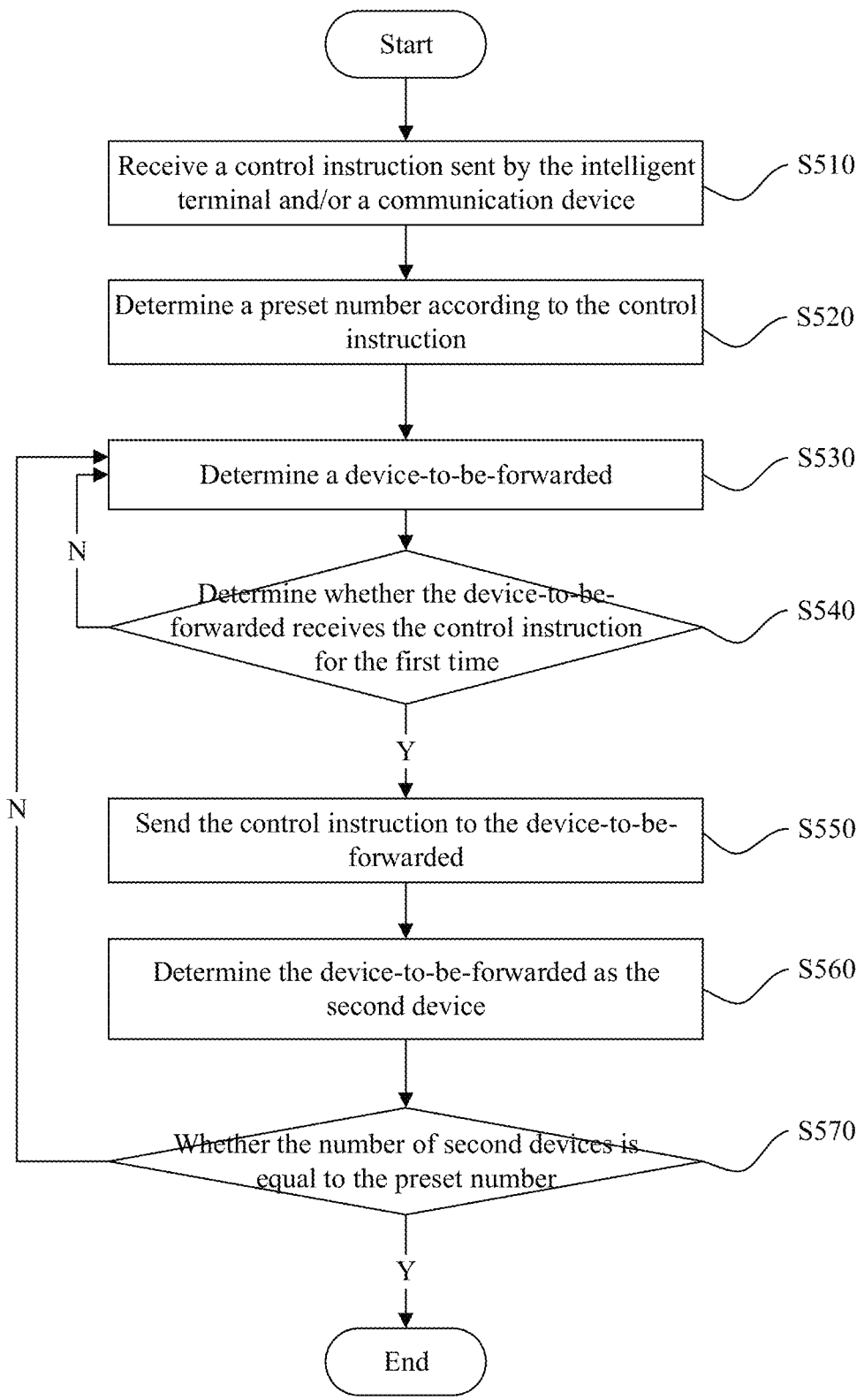
FIG. 7 shows a schematic flowchart of a communication method according to another embodiment of the present disclosure.

Referring to FIG. 7, another embodiment of the present disclosure provides a communication method, which can be applied to the first device side. The method may include Steps S510 to S570.

Step S510: Receive a control instruction sent by the intelligent terminal and/or a communication device.

Step S520: Determine a preset number according to the control instruction.

Step S530: Determine a device-to-be-forwarded, and the device-to-be-forwarded is one of the plurality of communication devices surrounding the first device.

For detailed descriptions of Steps S510 to S530, referring to Steps S410 to S430, which will not be repeated again here.

Step S540: Determine whether the device-to-be-forwarded receives the control instruction for the first time.

In the embodiments of the present disclosure, what is different from the above description is that, when the first device is connected to the device-to-be-forwarded, the first device first determines whether the device-to-be-forwarded receives the control instruction for the first time. If the device-to-be-forwarded receives the control instruction for the first time, the first device then sends the control instruction to the device-to-be-forwarded, thus saving the process of repeatedly sending the control instruction and improving the forwarding efficiency.

Figure 8:
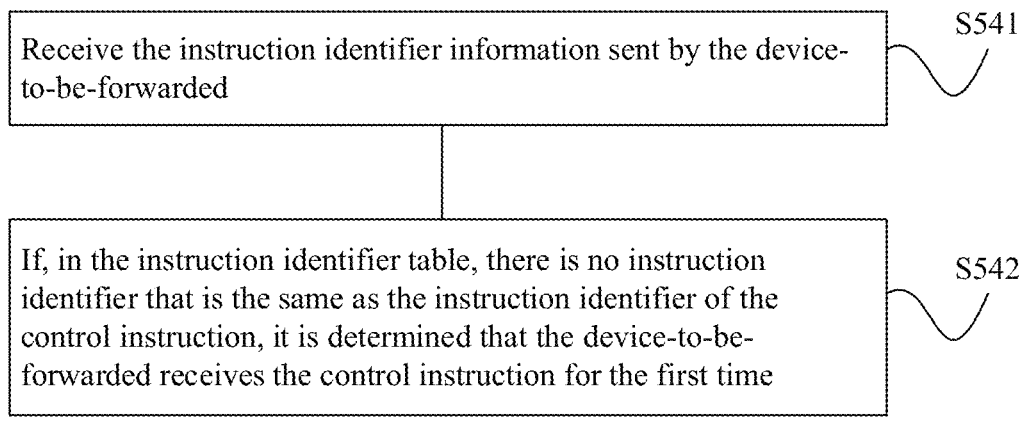
FIG. 8 shows a schematic flowchart of S540 according to another embodiment of the present disclosure.

Specifically, referring to FIG. 8, which shows a schematic flowchart of Step S540 in another embodiment of the present disclosure. In one embodiment of the present disclosure, Step S540 may include: Steps S541 to Step S542.

Step S541: Receive the instruction identifier information sent by the device-to-be-forwarded. The instruction identifier information includes an instruction identifier table. The instruction identifier table includes the instruction identifiers of all received control instructions of the device-to-be-forwarded.

In the embodiments of the present disclosure, the first device receives the instruction identifier information or message sent by the device-to-be-forwarded. In some implementations, if the first device establishes a connection with the device-to-be-forwarded, the device-to-be-forwarded may send the instruction identifier information to the first device. The instruction identifier information includes an instruction identifier table, and the instruction identifier table includes instruction identifiers of all control instructions received by the device-to-be-forwarded. The first device may further determine whether the device-to-be-forwarded has received the control instruction through the instruction identifier of the control instruction and the instruction identifier information sent by the device-to-be-forwarded.

Step S542: If, in the instruction identifier table, there is no instruction identifier that is the same as the instruction identifier of the control instruction, it is determined that the device-to-be-forwarded receives the control instruction for the first time.

In the embodiments of the present disclosure, if the instruction identifier table does not have the same identifier as the instruction identifier of the control instruction, it can be determined that the device-to-be-forwarded receives the control instruction for the first time.

Step S550: If it is determined that the device-to-be-forwarded receives the control instruction for the first time, send the control instruction to the device-to-be-forwarded.

Furthermore, the control instruction is sent to the device-to-be-forwarded that receives the control instruction for the first time. By determining in advance whether the device-to-be-forwarded has received the control instruction before, it is possible to reduce the number of control instructions sent to the device-to-be-forwarded that has received the control instruction, thereby improving the control instruction forwarding efficiency.

In some embodiments, if the instruction identifier table of the device-to-be-forwarded contains the same instruction identifier as the instruction identifier of the control instruction, then the device-to-be-forwarded has received the control instruction before, and the Step of determining the device-to-be-forwarded is returned to.

Step S560: Determine the device-to-be-forwarded as the second device.

In the embodiments of the present disclosure, if the first device determines that the device-to-be-forwarded has not received the control instruction according to the instruction determination information, it determines that the device-to-be-forwarded is the second device. The initial value of the number of second devices is zero, and the first device updates the number of the second devices after it is determined that the device-to-be-forwarded is the second device. Specifically, when it is confirmed that the device-to-be-forwarded is the second device, the number of the second devices is increased by 1. When it is confirmed that the device-to-be-forwarded is not the second device, the number of the second devices remains unchanged.

Step S570: If the number of second devices is not equal to the preset number, return to the Step of determining the device-to-be-forwarded.

In the embodiments of the present disclosure, if the number of second devices is not equal to the preset number, the Step of determining the device-to-be-forwarded is returned to execution, and the first device continues to send the control instruction to other communication devices.

After the first device sends the control instruction to the preset number of second devices, the first device ends forwarding the control instruction.

In some implementations, when the first device finishes forwarding the control instructions, that is, the first device has forwarded the control instructions to the preset number of second devices, the stored identifiers of the communication devices that has been sent the control instruction can be deleted, so as not to affect the forwarding of other control instructions by the first device.

Accordingly, another embodiment of the present disclosure relates to a communication method, which is improved on the basis of the previously described embodiments. The main improvement includes that, in one embodiment, another real-time method of determining whether the communication device is the second device is provided. Specifically, by receiving the instruction identifier information sent by the device-to-be-forwarded, if the instruction identifier information does not contain the same instruction identifier as the control instruction, the device-to-be-forwarded is determined to be the second device, and the control instruction is sent to the device-to-be-forwarded, thereby sending the control instruction to the preset number of second devices. That is, the control instruction is continuously transmitted to surrounding communication devices until all communication devices receive the control instruction, thus greatly improving the real-time performance and transmission distance of communication.

Referring to FIG. 1, which shows a communication system 100 provided by an embodiment of the present disclosure. The communication system 100 includes an intelligent terminal 110 and a plurality of communication devices 120.

The intelligent terminal 110 is used to determine the first device, and the first device is one of the multiple communication devices 120 around the intelligent terminal 110. The intelligent terminal 110 is also used to send a control instruction to the first device.

In the embodiments of the present disclosure, the first device is used to receive the control instruction sent by the intelligent terminal 110 and/or a communication device 120. The first device is also used to determine a preset number according to the control instruction. The first device is also used to use the first device as a relay node to relay the control instruction to a second device. The second device is one of the communication devices 120 among the multiple communication devices 120 around the first device. The control instruction is used to instruct using the second device as a relay node to relay the control instruction to a target communication device.

Figure 9:
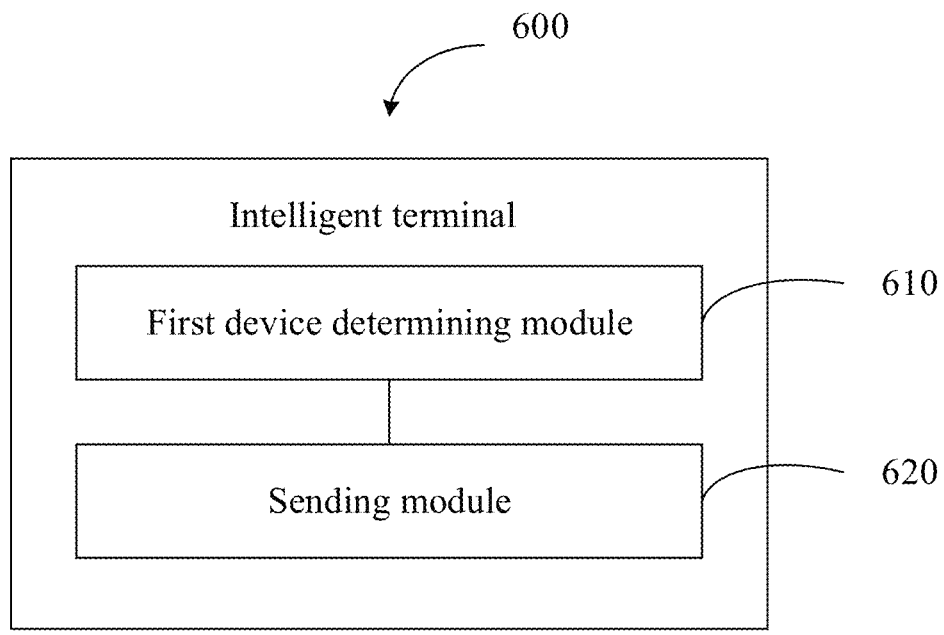
FIG. 9 shows a block diagram of an intelligent terminal according to an embodiment of the present disclosure.

Referring to FIG. 9, which shows an intelligent terminal 600 provided by an embodiment of the present disclosure. The intelligent terminal 600 includes: a first device determination module 610 and a sending module 620.

Further, the first device determining module 610 is used to determine the first device. The first device is one of the multiple communication devices around the intelligent terminal.

The sending module 620 is used to send the control instruction to the first device. The control instruction is used to instruct the first device to be used as a relay node to relay the control instruction to the target communication device.

It should be noted that the embodiments are described in a progressive manner. Each embodiment may focus on its differences from other embodiments. The same and similar parts between the various embodiments can be referred to each other. As for the device embodiments, since they are similar to the method embodiments, the description is relatively simple. For relevant details, refer to the relevant description of the method embodiments. Any processing method described in the method embodiments can be implemented by corresponding processing modules in the device embodiments, and will not be described one by one in the device embodiments.

Figure 10:
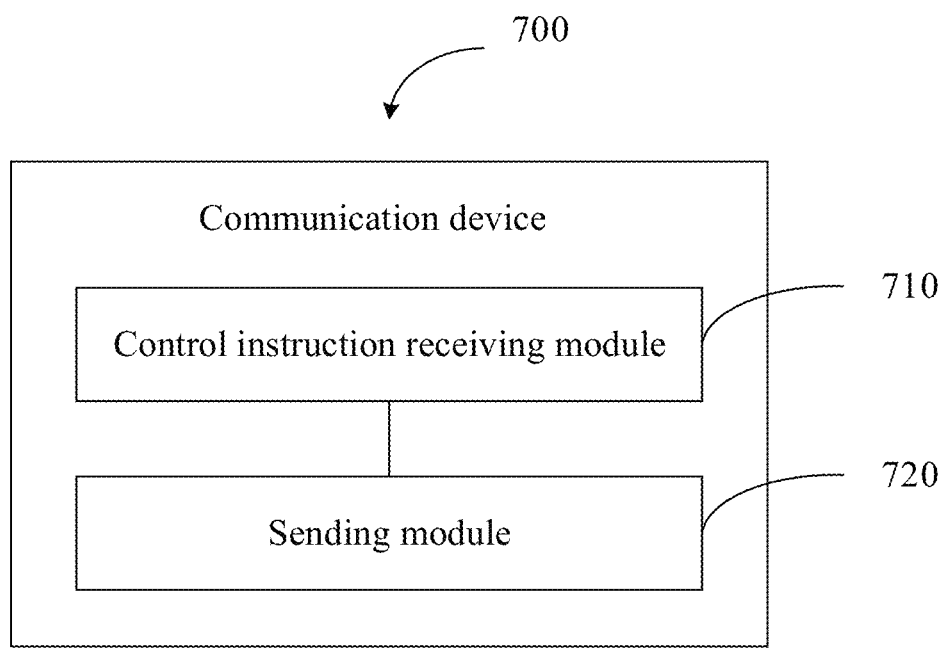
FIG. 10 shows a block diagram of a communication device according to another embodiment of the present disclosure.

Referring to FIG. 10, which shows a communication device 700 provided by another embodiment of the present disclosure. The communication device 700 includes: a control instruction receiving module 710 and a sending module 720.

Further, the control instruction receiving module 710 is used to receive the control instruction sent by the intelligent terminal and/or other communication devices.

The sending module 720 is used to use the first device as a transfer/relay node to relay the control instruction to the second device, and the control instruction is used to instruct the second device to be used as a transfer/relay node to relay the control instruction to the target communication device. The second device is a communication device among multiple communication devices around the first device.

It should be noted that the embodiments are described in a progressive manner. Each embodiment may focus on its differences from other embodiments. The same and similar parts between the various embodiments can be referred to each other. As for the device embodiments, since they are similar to the method embodiments, the description is relatively simple. For relevant details, refer to the relevant description of the method embodiments. Any processing method described in the method embodiments can be implemented by corresponding processing modules in the device embodiments, and will not be described one by one in the device embodiments.

Figure 11:
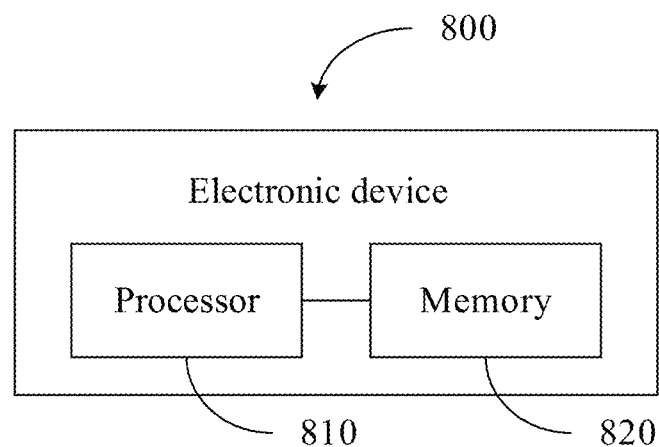
FIG. 11 shows a block diagram of an electronic device according to an embodiment of the present disclosure.

Referring to FIG. 11, based on the above communication methods, the embodiments of the present disclosure also provide another electronic device 800 that includes a processor that can execute the foregoing communication methods. The electronic device 800 also includes one or more processors 810 and a memory 820 for storing one or more application programs. The memory 820 stores programs that can execute the content in the foregoing embodiments, and the processor 810 can execute the programs stored in the memory 820.

The processor 810 may include one or more cores for processing data and a message matrix unit. The processor 810 uses various interfaces and lines to connect various parts of the entire electronic device 800, and executes various functions of the electronic device 800 and processes data by running or executing instructions, programs, code sets or instruction sets stored in the memory 820, and calling data stored in the memory 820. Optionally, the processor 810 may be implemented in hardware form of at least one of digital signal processing (DSP), field-programmable gate array (FPGA), and programmable logic array (PLA), etc. The processor 810 may integrate or is a combination of one or more of a central processing unit (CPU), a graphics processor (GPU), and a modem, etc. Further, the CPU mainly handles the operating system, user interface, and applications; the GPU is responsible for rendering and drawing the display content; and the modem is used to handle wireless communication. It can be understood that the above-mentioned modem may not be integrated into the processor and may be implemented solely through a communication chip.

The memory 820 may include random access memory (RAM) or read-only memory (ROM). The memory 820 may be used to store instructions, programs, code, sets of codes, or sets of instructions. The memory 820 may include a stored program area and a stored data area, where the stored program area may store instructions for implementing an operating system, instructions for implementing at least one function, instructions for implementing various method embodiments described below, and the like. The storage data area can also store data created by the terminal during use (such as instruction content, instruction identifier, preset number), etc.

Figure 12:
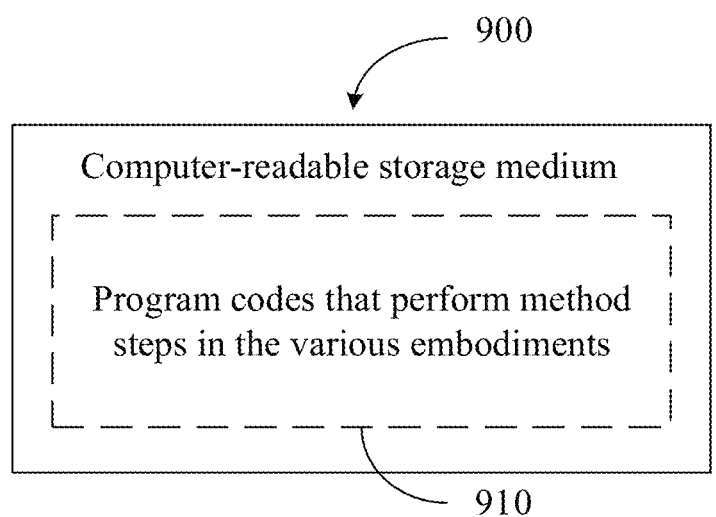
FIG. 12 shows a block diagram of a computer-readable storage medium according to an embodiment of the present disclosure.

Referring to FIG. 12, which shows a structural block diagram of a computer-readable storage medium 900 provided by an embodiment of the present disclosure. Program code 910 is stored in the computer-readable storage medium 900, and the program code 910 can be called by the processor to execute the methods described in the above method embodiments.

Computer-readable storage medium 900 may be electronic memory such as flash memory, EEPROM (electrically erasable programmable read-only memory), EPROM, hard disk, or ROM. Optionally, the computer-readable storage medium includes non-transitory computer-readable storage medium. The computer-readable storage medium 900 has storage space for program codes that perform any method step in the above methods. These program codes can be read from or written into one or more computer program products. The program code may, for example, be compressed in a suitable form.

According to the communication methods, systems, intelligent terminal, communication devices, and storage medium provided by the present disclosure, by determining the first device, where the first device is the communication device among the multiple communication devices around the intelligent terminal, a control instruction is sent to the first device. The control instruction is used to instruct the first device as a transfer node to relay the control instruction to the target communication device. Through forwarding the control instruction by communication devices, each communication device can quickly receive the control instruction, improving the real-time nature of communication. Further, through forwarding, communication devices further away can also receive the control instruction, extending the communication distance.

Finally, it should be noted that the above embodiments are only used to illustrate the technical solutions of the present disclosure, but not to limit the present disclosure. Although the present disclosure has been described in detail with reference to the foregoing embodiments, those of ordinary skill in the art understand that: modifications can still be made to the technical solutions described in the foregoing embodiments, or equivalent substitutions can be made to some of the technical features. However, these modifications or substitutions do not cause the essence of the corresponding technical solutions to deviate from the spirit and scope of the technical solutions in the embodiments of the present disclosure.

What is claimed is:

1. A communication method, wherein the communication method is for an intelligent terminal, the communication method comprising:
   determining a first device, the first device being one of a plurality of communication devices around the intelligent terminal;
   connecting to the first device; and
   sending a control instruction to the first device, wherein the control instruction is used to instruct the first device to be used as a relay node to relay the control instruction to a target communication device,
   wherein the control instruction contains a preset number that is an integer greater than two, and the sending a control instruction to the first device further includes:
   sending the control instruction to the first device, wherein the control instruction is used to instruct the first device as a relay node, so as to send the control instruction to the preset number of second devices respectively, such that the control instruction is relayed to the target communication device, the preset number of second devices being multiple communication devices around the first device.

2. The communication method according to claim 1, wherein the determining the first device further includes:
   determining the communication device with the strongest signal strength among the plurality of communication devices around the intelligent terminal as the first device.

3. The communication method according to claim 1, wherein the control instruction also includes an instruction identifier, and the instruction identifier corresponding to a different control instruction is different; and/or
   wherein the control instruction also includes instruction content, the instruction content is used to cause the first device to determine control content and an execution device that needs to execute the control content according to the instruction content, such that, if the first device is the execution device, the first device executes the control content.

4. The communication method according to claim 1, wherein, before determining the first device, the method further includes:
   generating the control instruction, the control instruction including a control type; and
   if the control type is a set control type or a group control type, connecting to the first device; wherein the set control type is used to indicate that the control instruction is used to control all of the plurality of communication devices around the intelligent terminal, and the group control type is used to indicate that the control instruction is used to control communication devices belonging to a same group among the plurality of communication devices around the intelligent terminal.

5. A communication method, wherein the communication method is applied to a first device, the communication method comprising:

receiving a control instruction sent by an intelligent terminal and/or a communication device; and using the first device as a relay node to relay the control instruction to at least one second device, wherein the second device is one of a plurality of communication devices around the first device, and the control instruction is used to instruct the second device to be used as a relay node to relay the control instruction to a target communication device, wherein the using the first device as a relay node to relay the control instruction to at least one second device further includes:

determine a preset number according to the control instruction; and using the first device as the relay node to relay the control instruction to the preset number of second devices respectively, wherein the control instruction is used to instruct a second device to be used as a relay node to relay the control instruction to the preset number of third devices respectively, so as to relay the control instruction to the target communication device.

6. The communication method according to claim 5, wherein the second devices are communication devices to which the first device has not sent the control instruction; and the third devices are communication devices to which the second device has not sent the control instruction.

7. The communication method according to claim 5, wherein the first device has a pre-established connection with at least one communication device among the plurality of communication devices around the first device; and the second device has a pre-established connection with at least one of a plurality of communication devices around the second device.

8. The communication method according to claim 5, wherein the sending the control instruction to the preset number of second devices respectively further includes:

determining a device-to-be-forwarded, where the device-to-be-forwarded is one of the plurality of communication devices around the first device;

sending the control instruction to the device-to-be-forwarded;

determining whether the device-to-be-forwarded receives the control instruction for a first time;

if it is determined that the device-to-be-forwarded receives the control instruction for the first time, determining that the device-to-be-forwarded is a second device; and if a number of the second devices is not equal to the preset number, continuing from the determining the device-to-be-forwarded.

9. The communication method according to claim 8, wherein the sending the control instruction to the device-to-be-forwarded further includes:

if the first device and the device-to-be-forwarded are connected in advance, sending the control instruction to the device-to-be-forwarded; and if the first device and the device-to-be-forwarded are not connected in advance, connecting to the device-to-be-forwarded and sending the control instruction to the device-to-be-forwarded.

10. The communication method according to claim 8, wherein:

the determining the preset number according to the control instruction further includes:

determining the preset number and an instruction identifier according to the control instruction, wherein the instruction identifier corresponding to a different control instruction is different; and the determining whether the device-to-be-forwarded receives the control instruction for the first time includes:

receiving instruction determination information sent by the device-to-be-forwarded, wherein the instruction determination information is used to indicate whether the device-to-be-forwarded has received the control instruction before; and determining whether the device-to-be-forwarded receives the control instruction for the first time according to the instruction determination information, wherein, when a instruction identifier table of the device-to-be-forwarded does not have a same instruction identifier as an instruction identifier of the control instruction, the device-to-be-forwarded receives the control instruction for the first time, and the instruction identifier table of the device-to-be-forwarded includes instruction identifiers of all control instructions received by the device-to-be-forwarded.

11. The communication method according to claim 5, wherein the sending the control instructions to a preset number of second devices respectively further includes:

determining a device-to-be-forwarded, wherein the device-to-be-forwarded is one of the plurality of communication devices around the first device;

determining whether the device-to-be-forwarded receives the control instruction for a first time;

if it is determined that the device-to-be-forwarded receives the control instruction for the first time, sending the control instruction to the device-to-be-forwarded;

determining that the device-to-be-forwarded is a second device; and if a number of the second devices is not equal to the preset number, continuing from the determining the device-to-be-forwarded.

12. The communication method according to claim 11, wherein:

the determining the preset number according to the control instruction further includes:

determining the preset number and an instruction identifier according to the control instruction, wherein the instruction identifier corresponding to a different control instruction is different; and the determining whether the device-to-be-forwarded receives the control instruction for the first time further includes:

receiving instruction identifier information sent by the device-to-be-forwarded, wherein the instruction identifier information includes an instruction identifier table, and the instruction identifier table includes instruction identifiers of all control instructions received by the device-to-be-forwarded; and if there is no instruction identifier that is the same as an instruction identifier of the control instruction in the instruction identifier table, determining that the device-to-be-forwarded receives the control instruction for the first time.

13. The communication method according to claim 5, wherein the sending the control instruction to a preset number of second devices respectively further includes:
sending the control instruction to the preset number of second devices within a preset time limit from when the preset number is determined according to the control instruction; and
if the control instruction is not sent to the preset number of second devices within the preset time limit, ending forwarding of the control instruction.

14. The communication method according to claim 5, wherein:
the determining the preset number according to the control instruction includes:
determining the preset number and instruction content according to the control instruction; and
after determining the preset number and instruction content according to the control instruction, the method further includes:
determining control content and an execution device that needs to execute the control content according to the instruction content, the control content being the content to be executed by the execution device; and
if the first device is the execution device, executing the control content.

15. An electronic device, comprising:
one or more processors; and
a memory for storing one or more application programs, wherein the one or more programs are configured to execute the one or more application programs to perform:
determining a first device, the first device being one of a plurality of communication devices around the electronic device;
connecting to the first device; and
sending a control instruction to the first device, wherein the control instruction is used to instruct the first device to be used as a relay node to relay the control instruction to a target communication device,
wherein the control instruction contains a preset number that is an integer greater than two, and the sending a control instruction to the first device further includes:
sending the control instruction to the first device, wherein the control instruction is used to instruct the first device as a relay node, so as to send the control instruction to the preset number of second devices respectively, such that the control instruction is relayed to the target communication device, the preset number of second devices being multiple communication devices around the first device.

16. The electronic device according to claim 15, wherein the determining the first device further includes:
determining the communication device with the strongest signal strength among the plurality of communication devices around the electronic device as the first device.

17. The electronic device according to claim 15, wherein the control instruction also includes an instruction identifier, and the instruction identifier corresponding to a different control instruction is different; and/or
wherein the control instruction also includes instruction content, the instruction content is used to cause the first device to determine control content and an execution device that needs to execute the control content according to the instruction content, such that, if the first device is the execution device, the first device executes the control content.

* * * * *